United States Patent
Frey et al.

(10) Patent No.: US 9,193,924 B2
(45) Date of Patent: Nov. 24, 2015

(54) METHODS AND APPARATUSES FOR FORMING LOW-METAL BIOMASS-DERIVED PYROLYSIS OIL

(75) Inventors: Stanley Joseph Frey, Palatine, IL (US); Rajeswar Gattupalli, Arlington Heights, IL (US); Timothy A. Brandvold, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 694 days.

(21) Appl. No.: 13/162,188

(22) Filed: Jun. 16, 2011

(65) Prior Publication Data
US 2012/0317871 A1    Dec. 20, 2012

(51) Int. Cl.
| | |
|---|---|
| *C10L 1/02* | (2006.01) |
| *C10G 25/02* | (2006.01) |
| *C10G 25/12* | (2006.01) |
| *C10G 31/09* | (2006.01) |
| *C10G 53/08* | (2006.01) |
| *B01J 49/00* | (2006.01) |
| *B01J 39/04* | (2006.01) |
| *C10B 53/02* | (2006.01) |

(52) U.S. Cl.
CPC ............... *C10L 1/02* (2013.01); *B01J 39/043* (2013.01); *B01J 49/0069* (2013.01); *C10G 25/02* (2013.01); *C10G 25/12* (2013.01); *C10G 31/09* (2013.01); *C10G 53/08* (2013.01); *C10B 53/02* (2013.01); *C10G 2300/1011* (2013.01); *C10G 2300/1014* (2013.01); *C10G 2300/205* (2013.01)

(58) Field of Classification Search
USPC .......................... 210/669–670, 673, 687, 263
See application file for complete search history.

(56) References Cited

U.S. PATENT DOCUMENTS

| | | | |
|---|---|---|---|
| 2,375,694 A * | 5/1945 | Schutze .................... | 208/194 |
| 2,413,784 A   | 1/1947 | Rawlings et al. | |
| 4,009,290 A * | 2/1977 | Okumori et al. ......... | 426/489 |
| 4,399,223 A * | 8/1983 | Vanderveen et al. ..... | 435/261 |

(Continued)

FOREIGN PATENT DOCUMENTS

| | | |
|---|---|---|
| WO | 2010037178 A1 | 4/2010 |
| WO | 2010075429 A1 | 7/2010 |

(Continued)

OTHER PUBLICATIONS

Venderbosch, R.H. et al. "Stabilization of Biomass-Derived Pyrolysis Oils," Journal of Chemical Technology and Biotechnology, v 85, n 5, p. 674-686, May 2010; ISSN: 02682575, E-ISSN: 10974660; DOI: 10.1002/jctb2354.

Mohammad, Javeed et al. "Stability of Pyrolysis Oils Produced From Auger and Entertained Flow Reactors," Conference Proceedings—2009 AIChE Annual Meeting, 09A1ChE, 2009, Conference Proceedings—2009 AIChE Annual Meeting, 09A1ChE; Conference: 2009 AIChE Annual Meeting, 09A1ChE, Nov. 8, 2009—Nov. 13, 2009; Publisher: American Institute of Chemical Engineers.

(Continued)

*Primary Examiner* — Chester Barry

(57) ABSTRACT

Embodiments of methods and apparatuses for forming a low-metal biomass-derived pyrolysis oil are provided. The method comprises the steps of filtering a biomass-derived pyrolysis oil with a high flux rate filter arrangement having a flux rate of about 10 L/m²/hr or greater to form a low-solids biomass-derived pyrolysis oil. The low-solids biomass-derived pyrolysis oil is filtered with a fine filter arrangement having a pore diameter of about 50 μm or less to form an ultralow-solids biomass-derived pyrolysis oil. The ultralow-solids biomass-derived pyrolysis oil is contacted with an ion-exchange resin to remove metal ions and form the low-metal biomass-derived pyrolysis oil.

17 Claims, 1 Drawing Sheet

(56) References Cited

U.S. PATENT DOCUMENTS

| | | | |
|---|---|---|---|
| 5,160,616 A * | 11/1992 | Blake-Coleman | 210/321.84 |
| 5,614,093 A * | 3/1997 | Mueggenburg et al. | 210/355 |
| 6,117,327 A | 9/2000 | Ciora et al. | |
| 6,143,174 A * | 11/2000 | Graus | 210/321.86 |
| 6,402,951 B1 * | 6/2002 | Wilson et al. | 210/500.25 |
| 6,730,267 B2 * | 5/2004 | Stringer et al. | 422/45 |
| 7,597,728 B1 * | 10/2009 | Adams et al. | 44/628 |
| 2002/0192144 A1 * | 12/2002 | Hostalek et al. | 423/522 |
| 2007/0137169 A1 * | 6/2007 | Ishigami et al. | 60/39.12 |
| 2008/0035528 A1 | 2/2008 | Marker | |
| 2008/0296236 A1 * | 12/2008 | Gross et al. | 210/791 |
| 2009/0229980 A1 * | 9/2009 | Hughes et al. | 204/547 |
| 2009/0253947 A1 | 10/2009 | Brandvold et al. | |
| 2010/0132258 A1 * | 6/2010 | Linck et al. | 48/197 FM |
| 2010/0163499 A1 * | 7/2010 | Odueyungbo | 210/787 |
| 2010/0219079 A1 * | 9/2010 | Routkevitch et al. | 205/175 |
| 2010/0223839 A1 | 9/2010 | Garcia-Perez et al. | |
| 2010/0236138 A1 | 9/2010 | Bauer et al. | |
| 2011/0146135 A1 | 6/2011 | Brandvold | |
| 2011/0146140 A1 | 6/2011 | Brandvold et al. | |
| 2011/0146141 A1 | 6/2011 | Frey et al. | |
| 2011/0146145 A1 | 6/2011 | Brandvold et al. | |
| 2011/0213188 A1 * | 9/2011 | Agblevor et al. | 585/242 |
| 2012/0017494 A1 * | 1/2012 | Traynor et al. | 44/388 |
| 2012/0023810 A1 * | 2/2012 | Fjare et al. | 44/307 |
| 2012/0311977 A1 * | 12/2012 | Wyss et al. | 55/361 |

FOREIGN PATENT DOCUMENTS

| | | |
|---|---|---|
| WO | 20100075429 A1 | 7/2010 |
| WO | 20110087676 A2 | 7/2011 |

OTHER PUBLICATIONS

French, Richard J. "Stabilization and Refining of Biomass Pyrolysis Oil by Hydroprocessing," ACS National Meeting Book of Abstracts, 2009, American Chemical Society—238th National Meeting and Exposition, ACS 2009, Abstracts of Scientific Papers; ISSN: 00657727; ISBN-13: 9780841200050.

Pisupati, Sarma V. et al. "Influence of Calcium Content of Biomass-Based Materials on Simultaneous NOx and SO2 Reduction," Environmental Science and Technology, v 42, n 7, p. 2509-2514, Apr. 1, 2008; ISSN: 0013936X; DOI: 10.10211es0719430.

Stojanowska, G. et al. "Influence of Minerals and Added Calcium on the Pyrolysis and Co-Pyrolysis of Coal and Biomass," Journal of the Energy Institute, v 78, n 3, p. 126-138, Sep. 2005; ISSN: 01442600; DOI: 10.1179/014426005X50788; Publisher: Energy Institute.

Dieni Mansur et al.: "Production of ketones from pyroligneous acid of woody biomass pyrolysis over an iron-oxide catalyst", FUEL, vol. 103, Apr. 16, 2011, pp. 130-134.

Matheel D Al-Sabti: New technological root for regnerating deminerlized water plants for safe environment, International Journal of Water Resources and Environmental Engineering, Feb. 28, 2011, pp. 52-56.

Search Report dated Feb. 4, 2015 for corresponding EP Application No. EP 12 80 0235.

* cited by examiner

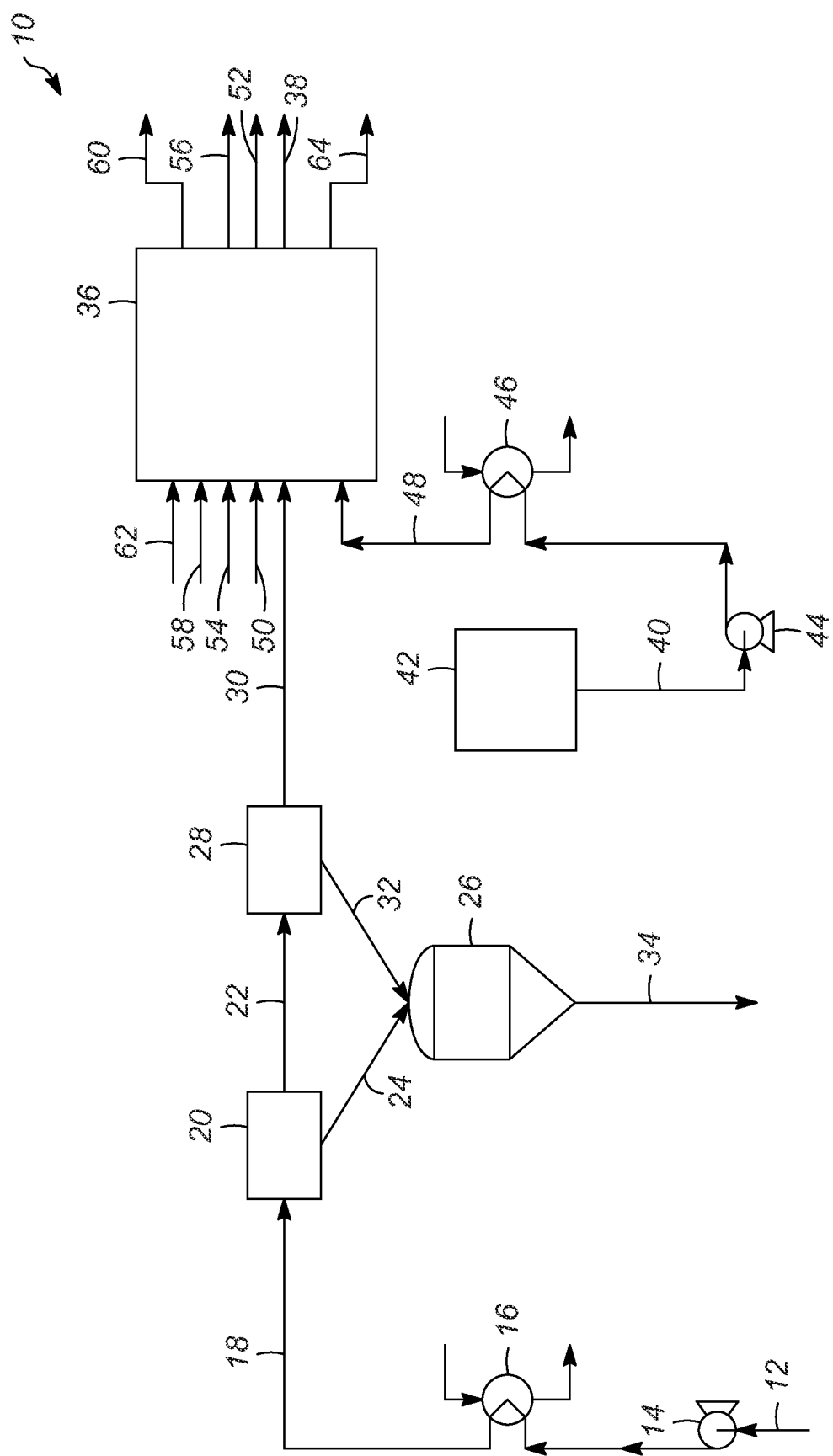

METHODS AND APPARATUSES FOR FORMING LOW-METAL BIOMASS-DERIVED PYROLYSIS OIL

FIELD OF THE INVENTION

The present invention relates generally to methods and apparatuses for producing biofuels, and more particularly to methods and apparatuses for forming a low-metal biomass-derived pyrolysis oil from biomass-derived pyrolysis oil.

BACKGROUND OF THE INVENTION

Fast pyrolysis is a process during which organic biomass materials, such as, wood waste, agricultural waste, etc. are rapidly heated to about 450° C. to about 600° C. in the absence of air using a process reactor. Under these conditions, organic vapors, pyrolysis gases and solid fragments of char and the like are produced. The vapors are condensed to form a biomass-derived pyrolysis oil. A biomass-derived pyrolysis oil can be burned directly as fuel for certain boiler and furnace applications, and can also serve as a potential feedstock in catalytic processes for the production of fuels in petroleum refineries. Biomass-derived pyrolysis oils have the potential to replace up to 60% of transportation fuels, thereby reducing the dependency on conventional petroleum and reducing its environmental impact.

However, biomass-derived pyrolysis oils are a complex, highly oxygenated organic liquid having properties that currently limit its utilization as a biofuel. For example, biomass-derived pyrolysis oils are typically contaminated with char and other insolubles produced during biomass pyrolysis. Char contributes to thermal instability of the oil. The char content is correlated with increases in viscosity, phase separation, and/or solids formation during storage. Separation of the char fragments from the biomass-derived pyrolysis oil has proven very difficult. For example, conventional liquid filtration is difficult as the liquid biomass-derived pyrolysis oil can have a gel-like consistency.

Additionally, metals in the biomass-derived pyrolysis oil limit its commercial applications. Metals are present in the solid fragments and are also dissolved in the biomass-derived pyrolysis oil as metal cations. The metals contribute to the ash content of the oil upon combustion. It is desirable to reduce and/or minimize the ash content in the biomass-derived pyrolysis oil because such ash raises the total ash and particulate emissions when the biomass-derived pyrolysis oil is burned for consumption as a fuel. Environmental restrictions may limit such total emissions. In addition, when the biomass-derived pyrolysis oil is used as feedstock in catalytic processes to make transportation fuel, the metals in the oil foul downstream equipment and inhibit or inactivate catalysts.

Accordingly, it is desirable to provide methods and apparatuses for forming a biomass-derived pyrolysis oil having a relatively low metal concentration. In addition, it is desirable to provide methods and apparatuses for removing solid fragments, such as char and other insolubles to form a biomass-derived pyrolysis oil with increased thermal stability. Furthermore, other desirable features and characteristics of the present invention will become apparent from the subsequent detailed description of the invention and the appended claims, taken in conjunction with the accompanying drawings and this background of the invention.

SUMMARY OF THE INVENTION

Methods and apparatuses for forming a low-metal biomass-derived pyrolysis oil are provided herein. In accordance with an exemplary embodiment, a method for forming a low-metal biomass-derived pyrolysis oil comprises the steps of filtering a biomass-derived pyrolysis oil with a high flux rate filter arrangement having a flux rate of about 10 L/m²/hr or greater to form a low-solids biomass-derived pyrolysis oil. The low-solids biomass-derived pyrolysis oil is filtered with a fine filter arrangement having a pore diameter of about 50 µm or less to form an ultralow-solids biomass-derived pyrolysis oil. The ultralow-solids biomass-derived pyrolysis oil is contacted with an ion-exchange resin to remove metal ions and form the low-metal biomass-derived pyrolysis oil.

In accordance with another exemplary embodiment, a method for forming a low-metal biomass-derived pyrolysis oil is provided. The method comprises the steps of filtering a biomass-derived pyrolysis oil to form an ultralow-solids biomass-derived pyrolysis oil. A first portion of the ultralow-solids biomass-derived pyrolysis oil is contacted with an acidic ion-exchange resin having sulfonic acid groups to form a first amount of the low-metal biomass-derived pyrolysis oil and a spent ion-exchange resin. The spent ion-exchange resin is regenerated including contacting the spent ion-exchange resin with a solution containing sodium ions to exchange potassium ions, calcium ions, magnesium ions, strontium ions, titanium ion, vanadium ions copper ions, iron ions, cobalt ions, chromium ions, lead ions, manganese ions, nickel ions, zinc ions and other mono-, divalent or trivalent metal ions present in the biomass-derived pyrolysis oil which are removed by ion exchange, or combinations thereof from the spent ion-exchange resin with the sodium ions from the solution to form a spent sodium-ion-containing exchange resin that is regenerated to form a regenerated ion-exchange resin. A second portion of the ultralow-solids biomass-derived pyrolysis oil is contacted with the regenerated ion-exchange resin to form a second amount of the low-metal biomass-derived pyrolysis oil In accordance with another exemplary embodiment, and apparatus for forming a low-metal biomass-derived pyrolysis oil is provided. The apparatus comprises a high flux rate filter arrangement that is configured to receive and filter a biomass-derived pyrolysis oil to form a low-solids biomass-derived pyrolysis oil. A fine filter arrangement is in fluid communication with the high flux rate filter arrangement to receive the low-solids biomass-derived pyrolysis oil and is configured to filter the low-solids biomass-derived pyrolysis oil to form an ultralow-solids biomass-derived pyrolysis oil. An ion-exchange unit contains an ion-exchange resin and is in fluid communication with the fine filter arrangement to receive the ultralow-solids biomass-derived pyrolysis oil. The ion-exchange unit is configured to contact the ultralow-solids biomass-derived pyrolysis oil with the ion-exchange resin to remove metal ions and form the low-metal biomass-derived pyrolysis oil.

BRIEF DESCRIPTION OF THE DRAWINGS

Embodiments of the present invention will hereinafter be described in conjunction with the following drawing figures, wherein like numerals denote like elements, and wherein:

FIG. 1 schematically illustrates an apparatus for forming a low-metal biomass-derived pyrolysis oil in accordance with an exemplary embodiment.

DETAILED DESCRIPTION

The following Detailed Description is merely exemplary in nature and is not intended to limit the invention or the application and uses of the invention. Furthermore, there is no intention to be bound by any theory presented in the preceding Background of the Invention or the following Detailed Description.

Various embodiments contemplated herein relate to methods and apparatuses for forming a biomass-derived pyrolysis oil having a relatively low metal concentration (hereinafter "low-metal biomass-derived pyrolysis oil") from a solids- and metal-containing biomass-derived pyrolysis oil (hereinafter "biomass-derived pyrolysis oil" or "starting oil"). It should be appreciated that, while the treated oil described herein is referred to as a "low-metal biomass-derived pyrolysis oil," a "low-metal biomass-derived pyrolysis oil" generally includes any biomass-derived pyrolysis oil treated to have a lower total metal concentration than the concentration of the total metals in the starting biomass-derived pyrolysis oil. Unlike the prior art, the exemplary embodiments taught herein form a low-solids biomass-derived pyrolysis oil by filtering a biomass-derived pyrolysis oil using a high flux rate filter arrangement. Preferably, the biomass-derived pyrolysis oil is heated to reduce its viscosity prior to being passed through the high flux rate filter arrangement to facilitate filtering. The high flux rate filter arrangement removes larger solid fragments of char including metals and other insolubles from the biomass-derived pyrolysis oil preferably without plugging or clogging of the filter arrangement. The low-solids biomass-derived pyrolysis oil is subsequently filtered by a fine filter arrangement to remove the remaining smaller solid fragments to form an ultralow-solids biomass-derived pyrolysis oil with increased thermal stability. Also, because the larger solid fragments have been removed from the biomass-derived pyrolysis oil by the high flux rate filter arrangement, filtering the remaining smaller solid fragments from the low-solids biomass-derived pyrolysis oil with the fine filter arrangement is facilitated preferably without plugging or clogging of the filter arrangement. The ultralow-solids biomass-derived pyrolysis oil is treated using an ion-exchange resin that further reduces the concentration of the metals in the oil. In general, the ion-exchange resin removes alkali metals (e.g. sodium, potassium, and cesium), alkaline earth metals (e.g. magnesium, calcium, and strontium), transition metals (Fe, Ni, Mn), and other metals dissolved in the ultralow-solids biomass-derived pyrolysis oil to prepare a low-metal biomass-derived pyrolysis oils that is more suitable for use as a biofuel.

Referring to FIG. 1, a schematic depiction of an apparatus 10 for forming a low-metal biomass-derived pyrolysis oil in accordance with an exemplary embodiment is provided. A biomass-derived pyrolysis oil stream 12 is provided to the apparatus 10 from a source, such as a feed tank or other source operative to provide the biomass-derived pyrolysis oil stream 12. The biomass-derived pyrolysis oil may be produced, for example, from pyrolysis of biomass in a pyrolysis reactor. Virtually any form of biomass can be used for pyrolysis to produce a biomass-derived pyrolysis oil. The biomass-derived pyrolysis oil may be derived from biomass material, such as, wood, agricultural waste, nuts and seeds, algae, forestry residues, and the like. The biomass-derived pyrolysis oil may be obtained by different modes of pyrolysis, such as, for example, fast pyrolysis, vacuum pyrolysis, catalytic pyrolysis, and slow pyrolysis or carbonization, and the like.

The composition of the biomass-derived pyrolysis oil can vary considerably and depends on the feedstock and processing variables. Biomass-derived pyrolysis oils typically contain up to about 2000 to about 5000 ppm total metals, about 20 to about 33 wt. % of water, and about 1 wt. % to about 5 wt. % of solids fragments of char and the like. The metals are present in the solid fragments as well as dissolved in the liquid phase of the biomass-derived pyrolysis oil and typically include alkali metals, alkaline earth metals, transition metals, and heavy metals. Metals are indigenous to all biomass and thus to the starting biomass-derived pyrolysis oil. These metals contribute to the ash content of the oil upon combustion. Biomass-derived pyrolysis oil is available from, for example, Ensyn Technologies Inc., headquartered in Ontario, Canada.

In one embodiment, the biomass-derived pyrolysis oil stream 12 is pressurized by a feed pump 14. The biomass-derived pyrolysis oil stream 12 can be pressurized to a pressure of from about 550 to about 950 kPa gauge. The biomass-derived pyrolysis oil stream 12 then is passed along to a heat exchanger 16. In an exemplary embodiment, the biomass-derived pyrolysis oil stream 12 is heated by indirect heat exchange via the heat exchanger 16 to a temperature of from about 30 to about 60° C., and preferably from about 40 to about 50° C., to form a heated biomass-derived pyrolysis oil stream 18. The inventors have found that by heating the biomass-derived pyrolysis oil, the viscosity of the oil is reduced to facilitate and improve downstream treatment operations for the removal of solids and metals from the oil.

As illustrated, the heated biomass-derived pyrolysis oil stream 18 is advanced to a high flux rate filter arrangement 20. In general, the performance of a filter or filter arrangement that may include multiple filter mediums or elements is often defined by "flux rate," which is the volume of feed (biomass-derived pyrolysis oil) filtered per unit filter area per unit time. Accordingly, a higher flux rate filter arrangement can filter higher feed rates of feed preferably without clogging or plugging the filter arrangement, allowing larger volumes of feed to be filtered per unit time. In an exemplary embodiment, the high flux rate filter arrangement 20 has a flux rate of about 10 liter/meter$^2$/hour (L/m$^2$/hr) or greater, preferably of about 20 L/m$^2$/hr or greater, more preferably of about 100 L/m$^2$/hr or greater, more preferably of from about 100 to about 500 L/m$^2$/hr, and most preferably of from about 200 to about 500 L/m$^2$/hr.

The high flux rate filter arrangement 20 may be, for example, a vacuum, gravity, or pressure filtration system or the like. The high flux rate filter arrangement 20 may comprise a filter medium or a combination of filter mediums, such as, nitrocellulose, cellulose acetate, glass fiber, polymeric (such as polytetrafluoroethylene and nylon-6), wire mesh, sintered metal, and the like, and can be provided in a variety of shapes, sizes, and configurations. The filter medium preferably has a pore diameter smaller than the majority of the char and other insolubles in the biomass-derived pyrolysis oil but not so small as to cause clogging or plugging of the high flux rate filter arrangement 20. In an exemplary embodiment, the high flux rate filter arrangement 20 comprises a filter medium having a filter pore diameter of about 50 μm or greater, and preferably of from about 50 to about 100 μm. Exemplary filter/filter medium and filtration equipment suppliers include Whatman Plc (headquartered in Kent, U.K.), Millipore Corporation (headquartered in Billerica, Mass.), Filtrex Corporation (headquartered in Attleboro, Mass.), and Pall Corporation (headquartered in Port Washington, N.Y.).

As illustrated, the high flux rate filter arrangement 20 is a pressure filtration system and the heated biomass-derived pyrolysis oil stream 18 is passed through and filtered by the high flux rate filter arrangement 20 preferably without causing a substantial pressure drop across the high flux rate filter arrangement 20. In one example, filtering the heated biomass-derived pyrolysis oil stream 18 produces a pressure drop across the high flux rate filter arrangement 20 of no more than about 175 kPa. The high flux rate filter arrangement 20 removes a majority of the solids, e.g. rough filtering, from the heated biomass-derived pyrolysis oil stream 18 to form a low-solids biomass-derived pyrolysis oil stream 22 and a filter cake 24 that is formed from the removed solids. Preferably, the low-solids biomass-derived pyrolysis oil stream 22 has a solids contents of about 1500 ppm or less, and more preferably of about 1000 ppm or less. The filter cake 24 is removed from the filter medium of the high flux rate filter arrangement 20 using, for example, centrifugal force, a pressure differential, and the like and is passed from the high flux rate filter arrangement 20 to a tank 26.

The low-solids biomass-derived pyrolysis oil stream 22 is advanced to a fine filter arrangement 28. The fine filter arrangement 28 may be, for example, a vacuum, gravity, or pressure filtration system or the like. The fine filter arrangement 28 may comprise a filter medium or a combination of filter mediums, such as, nitrocellulose, cellulose acetate, glass fiber, polymeric (such as polytetrafluoroethylene and nylon-6), wire mesh, sintered metal, and the like, and can be provided in a variety of shapes, sizes, and configurations. The filter medium preferably has a pore diameter smaller than the remaining char and other insolubles in the biomass-derived pyrolysis oil. In an exemplary embodiment, the fine filter arrangement 28 comprises a filter medium having a filter pore diameter of about 50 μm or less, and preferably of from about 5 to about 50 μm. Exemplary filter/filter medium and filtration equipment suppliers include Whatman Plc (headquartered in Kent, U.K.), Millipore Corporation (headquartered in Billerica, Mass.), Filtrex Corporation (headquartered in Attleboro, Mass.), and Mott Corporation (headquartered in Farmington, Conn.).

As illustrated, the fine filter arrangement 28 is a pressure filtration system and the low-solids biomass-derived pyrolysis oil stream 22 is passed through and filtered by the fine filter arrangement 28 preferably without causing a substantial pressure drop across the fine filter arrangement 28. In one example, filtering the low-solids biomass-derived pyrolysis oil stream 22 produces a pressure drop across the fine filter arrangement 28 of no more than about 175 kPa. The fine filter arrangement 28 removes substantially all of the remaining solids, e.g. fine filtering, from the low-solids biomass-derived pyrolysis oil stream 22 to form an ultralow-solids biomass-derived pyrolysis oil stream 30 and a filter cake 32 that is formed from the removed solids. Preferably, the ultralow-solids biomass-derived pyrolysis oil stream 30 has a solids contents of about 100 ppm or less, and more preferably of about 50 ppm or less, and most preferably of about 10 ppm or less. The filter cake 32 is removed from the filter medium of the fine filter arrangement 28 using, for example, centrifugal force, a pressure differential, and the like and is passed from the fine filter arrangement 28 to the tank 26. The filter cakes 24 and 32 are removed from the tank 26 along line 34 for disposal, further processing, fuel for heat generation, and/or the like.

The inventors have found that by filtering the biomass-derived pyrolysis oil to remove substantially all of the solids, the majority of the metals are removed and the thermal stability of the oil is increased. As used herein, "thermal stability" means the ability of the oil to resist changes in chemical composition and maintain phase stability as its temperature changes or with extended storage time. Filtration helps to lower viscosity, maintain homogeneity by improving phase stability, improve clarity, and increase pumpability of the oils produced in accordance with exemplary embodiments contemplated herein.

The remaining metals present in the ultralow-solids biomass-derived pyrolysis oil stream 30 are primarily dissolved and in the form of metal cations. In one example, the ultralow-solids biomass-derived pyrolysis oil stream 30 has a total metals content of about 1000 ppm.

The ultralow-solids biomass-derived pyrolysis oil stream 30 is passed along to an ion-exchange zone 36. In one embodiment, the ion-exchange zone 36 may comprise a batch ion-exchange unit containing an ion-exchange resin where the ion exchange function is discontinued to regenerate the ion-exchange resin when it becomes spent (i.e. inactive or used). Alternatively, the ion-exchange zone 36 may comprise two or more ion-exchange units each containing an ion-exchange resin (unspent or active ion-exchange resin in one unit and spent ion-exchange resin in the other unit) and arranged in a swing bed configuration for continuous operation, regenerating the spent ion-exchange resin in one unit while the unspent ion-exchange resin in the other unit is being used for ion exchange, as is well known in the art. Other ion-exchange zone arrangements known to those skilled in the art may also be used.

The ultralow-solids biomass-derived pyrolysis oil stream 30 contacts the ion-exchange resin and undergoes ion exchange such that the metal cations contained in the ultralow-solids biomass-derived pyrolysis oil stream 30 are captured by the ion-exchange resin. In an exemplary embodiment, the ion-exchange resin contains sulfonic acid at its active sites. When the ultralow-solids biomass-derived pyrolysis oil stream 30 contacts the resin, the metals preferentially migrate out of the oil to the active sites on the ion-exchange resin. The metals in the ultralow-solids biomass-derived pyrolysis oil stream 30 are replaced by hydrogen ions from the resin to form a low-metal biomass-derived pyrolysis oil stream 38 and spent catalyst. In an exemplary embodiment, the total metal content of the ultralow-solids biomass-derived pyrolysis oil stream 30 is reduced to a concentration of about 100 ppm or less to form the low-metal biomass-derived pyrolysis oil stream 38. The metals removed from the oil during ion exchange include the alkali metals, such as, sodium (Na), potassium (K) and cesium (Cs), the alkaline earth metals, such as, magnesium (Mg), calcium (Ca) and strontium (Sr), and the transition metals, such as, iron (Fe), manganese (Mn) and nickel (Ni).

The ion-exchange resin temperature during ion exchange may be from about 10 to about 120° C., and preferably from about 20 to about 60° C. The ultralow-solids biomass-derived pyrolysis oil stream 30 may be passed through the ion-exchange zone 36 by positive pressure flow or by gravity flow. When pressure is applied, the absolute pressure is from greater than 0 to about 13790 KPa (0 to about 2000 psi), preferably from greater than 0 to about 689.5 KPa (greater than 0 to about 100 psi), and most preferably from about 13.8 to about 206.8 KPa (about 2 to about 30 psi). When no pressure is applied, the ultralow-solids biomass-derived pyrolysis oil stream 30 passes downward through the ion-exchange unit or units in the ion-exchange zone 36 and is allowed to slowly elute gravimetrically.

In an exemplary embodiment, the ultralow-solids biomass-derived pyrolysis oil stream 30 is passed over the ion-exchange resin at a Liquid Hourly Space Velocity (LHSV) of from about 0.1 to about 20 $hr^{-1}$, and preferably from about 1 to about 10 $hr^{-1}$. The faster the Liquid Hourly Space Velocity (LHSV), the less time there is for the ion-exchange. When the Liquid Hourly Space Velocity (LHSV) is reduced, the concentration of the selected metal ions in the treated oil is reduced significantly.

When metal levels in the low-metal biomass-derived pyrolysis oil stream 38 reaches a target concentration, or when metal concentration is constant (as determined by repeat measurements) over an extended time period, contact between the oil and the resin may be concluded and ion-exchange is deemed "complete". Metal concentrations in the oil may be measured by Atomic Absorption Spectroscopy (AAS), Inductively-Coupled Plasma-Atomic Absorption Spectroscopy (ICP-AAS), or other known methods.

The ion-exchange resins useful in the ion-exchange zone 36 in accordance with exemplary embodiments are strongly acidic cation-exchange resins. Preferably, the resin is used in the protonated form, i.e., all of the active groups are —SO$_3$H. In one example, the resin comprises sulfonated copolymers of styrene.

The preferred sulfonic acid resins are macroreticular resins. As used herein, "macroreticular resins" are made of two continuous phases-a continuous pore phase and a continuous gel polymeric phase. The continuous gel polymeric phase is structurally composed of small spherical microgel particles agglomerated together to form clusters, which, in turn, form interconnecting pores. The surface area arises from the exposed surface of the microgel clusters. The macroreticular ion exchange resins can be made with different surface areas of from about 7 to about 1,500 m$^2$/g, and average pore diameters of from about 5 to about 10,000 nm.

Gel-type resins may also be used. As used herein, "gel-type resins" are generally translucent. There are no permanent pore structures for the gel-type resins. The pores are generally considered to be molecular-scale micropores. The pore structures are determined by the distance between the polymer chains and crosslinks that vary with the crosslink level of the polymer, the polarity of the solvent, and the operating conditions.

Some nonlimiting examples of acidic ion-exchange resins that may be used in accordance with exemplary embodiments include those manufactured by Dow Chemical Co., headquartered in Midland, Mich., under the tradenames/trademarks DOWEX® MARATHON C, DOWEX® MONOSPHERE C-350, DOWEX® HCR-S/S, DOWEX® MARATHON MSC, DOWEX® MONOSPHERE 650C, DOWEX® HCR-W2, DOWEX® MSC-1, DOWEX® HGR NG (H), DOWEX® DR-G8, DOWEX® 88, DOWEX® MONOSPHERE 88, DOWEX® MONOSPHERE C-600 B, DOWEX® MONOSPHERE M-31, DOWEX® MONOSPHERE DR-2030, DOWEX® M-31, DOWEX® G-26 (H), DOWEX® 50W-X4, DOWEX® 50W-X8, DOWEX® 66; those manufactured by Rohm and Haas, headquartered in Philadelphia, Pa., under the tradenames/trademarks Amberlyst® 131, Amberlyst® 15, Amberlyst® 16, Amberlyst® 31, Amberlyst® 33, Amberlyst® 35, Amberlyst® 36, Amberlyst® 39, Amberlyst® 40 Amberlyst® 70, Amberlite® FPC11, Amberlite® FPC22, Amberlite® FPC23; those manufactured by Brotech Corp., headquartered in Bala Cynwyd, Pa., under the tradenames/trademarks Purofine® PFC150, Purolite® C145, Purolite® C150, Purolite® C160, Purofine® PFC100, Purolite® C100; and those manufactured by Thermax Limited Corp., headquartered in Novi, Mich., under the tradename/trademark Monoplus™ S100 and Tulsion® T42. Other acidic ion-exchange resins known to those skilled in the art may also be used.

The low-metal biomass-derived pyrolysis oil stream 38 is removed from the ion-exchange zone 36 for further processing, use as a biofuel, and the like, leaving behind spent ion-exchange resin in the ion-exchange zone 36. If the ion-exchange zone 36 is configured as a batch ion-exchange batch process, introduction of the ultralow-solids biomass-derived pyrolysis oil stream 30 to the ion-exchange zone 36 is discontinued for regenerating the spent ion-exchange resin. Alternatively, if the ion-exchange zone 36 is configured as a swing bed continuous process, the ultralow-solids biomass-derived pyrolysis oil stream 30 is redirected from one of the ion-exchange units containing the spent ion-exchange resin to a second ion-exchange unit containing a regenerated ion-exchange resin.

In accordance with an exemplary embodiment, the spent ion-exchange resin then is regenerated. As illustrated, an oxygenated ion-exchange regenerant stream 40 for regenerating the spent ion-exchange resin is removed from a storage tank 42 and passed through a pump 44 to a heat exchanger 46. In an exemplary embodiment, the oxygenated ion-exchange regenerant comprises ethanol, methanol, acetone, 2-butanone, or combinations thereof. Preferably, the oxygenated ion-exchange regenerant stream 40 is heated by indirect heat exchange via a heat exchanger 46 to a temperature of from about 30 to about 60° C. to form a heated oxygenated ion-exchange regenerant stream 48. The heated oxygenated ion-exchange regenerant stream 48 is passed along and advanced through the ion-exchange zone 36 to remove any remaining residual oil by washing the spent ion-exchange resin. The oxygenated ion-exchange regenerant stream containing the residual oil is removed from the ion-exchange zone 36 and may be added to the low-metal biomass-derived pyrolysis oil via stream 38, which has been found to help improve the storage stability of the oil, or is removed via a separate line. Typically about 0.1 to about 10 times the operating volume of the ion-exchange unit being regenerated of oxygenated ion-exchange regenerant is used to recover the residual oil, and then the introduction of the heated alcohol-ion exchange regenerant stream 48 to the ion-exchange zone 36 is discontinued.

In accordance with another embodiment, a freshwater rinse stream 50 is introduced to the ion-exchange zone 36 and is passed over the spent ion-exchange resin to remove any residual oxygenated ion-exchange regenerant. The freshwater rinse and residual oxygenated ion-exchange regenerant are removed from the ion-exchange zone 36 along line 52.

In an exemplary embodiment, a sodium ion solution stream 54 is introduced to the ion-exchange zone 36 and is passed over the washed and rinsed spent ion-exchange resin. Sodium ions from the sodium ion solution stream 54 are exchanged with the metal ions contained on the spent ion-exchange resin, such as, for example, potassium ions, calcium ions, magnesium ions, strontium ions, titanium ion, vanadium ions copper ions, iron ions, cobalt ions, chromium ions, lead ions, manganese ions, nickel ions, zinc ions and other mono-, di- or trivalent metal ions present in the original pyrolysis oil which are removed by ion exchange, or combinations thereof. The inventors have found that by removing in particular, the calcium ions on the spent catalyst with sodium ions, the subsequent step of regenerating the spent catalyst with an aqueous sulfuric acid solution prevents the formation of calcium sulfate, which tends to precipitate out and clog or plug the ion-exchange zone 36. In one example, the sodium ion solution stream 54 is an aqueous solution of sodium chloride having a concentration of from about 5 to about 15 molar percent (mol. %). The exchanged sodium ion solution is removed from the ion-exchange unit along line 56 and the introduction of the sodium ion solution stream 54 to the ion-exchange zone 36 is discontinued preferably when substantially all of the calcium ions in the spent ion-exchange resin have been exchanged with sodium ions.

The spent ion-exchange resin is then contacted by an aqueous stream of sulfuric acid 58 to remove the sodium ions and any other metal ions contained on the spent ion-exchange resin, replacing these ions with hydrogen ions until the spent ion-exchange resin is regenerated. In an exemplary embodiment, the aqueous stream of sulfuric acid 58 comprises about 5 to about 10 mol. % of sulfuric acid. The ion exchanged aqueous sulfuric acid is removed from the ion-exchange zone 36 along line 60 for further treatment, disposal and the like, and a fresh water rinse stream 62 is passed over the regenerated catalyst to remove any residual acid. The water rinse with any residual acid is removed from the ion-exchange zone 36 along line 64. The regenerated ion-exchange resin is now ready to receive the ultralow-solids biomass-derived pyrolysis oil stream 30 to form additional low-metal biomass-derived pyrolysis oil.

Accordingly, methods and apparatuses for forming a low-metal biomass-derived pyrolysis oil have been described. Unlike the prior art, the exemplary embodiments taught herein form a low-solids biomass-derived pyrolysis oil by filtering a biomass-derived pyrolysis oil using a high flux rate filter arrangement. Preferably, the biomass-derived pyrolysis oil is heated to reduce its viscosity prior to being passed through the high flux rate filter arrangement to facilitate filtering. The high flux rate filter arrangement removes larger solid fragments of char including metals and other insolubles from the biomass-derived pyrolysis oil preferably without plugging or clogging of the filter arrangement. The low-solids biomass-derived pyrolysis oil is subsequently filtered by a fine filter arrangement to remove the remaining smaller solid fragments to form an ultralow-solids biomass-derived pyrolysis oil with increased thermal stability. Also, because the larger solid fragments have been removed from the biomass-derived pyrolysis oil by the high flux rate filter arrangement, filtering the remaining smaller solid fragments from the low-solids biomass-derived pyrolysis oil with the fine filter arrangement is facilitated preferably without plugging or clogging of the filter arrangement. The ultralow-solids biomass-derived pyrolysis oil is treated using an ion-exchange resin that further reduces the concentration of the metals in the oil to form a low-metal biomass-derived pyrolysis oils that is more suitable for use as a biofuel.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention, it being understood that various changes may be made in the function and arrangement of elements described in an exemplary embodiment without departing from the scope of the invention as set forth in the appended Claims and their legal equivalents.

What is claimed is:

1. A method for forming a low-metal biomass-derived pyrolysis oil, the method comprising the steps of:
   filtering a biomass-derived pyrolysis oil with a high flux rate filter arrangement having a filter pore diameter of about 50 μm or greater with a flux rate of about 200 L/m²/hr to about 500 L/m²/hr to form a low-solids biomass-derived pyrolysis oil, wherein during filtering the biomass-derived pyrolysis oil is a liquid that comprises metals and char;
   filtering the low-solids biomass-derived pyrolysis oil with a fine filter arrangement having a pore diameter of about 50 μm or less to form an ultralow-solids biomass-derived pyrolysis oil; and
   contacting the ultralow-solids biomass-derived pyrolysis oil with an ion-exchange resin to remove metal ions and form the low-metal biomass-derived pyrolysis oil.

2. The method according to claim 1, wherein the step of filtering the biomass-derived pyrolysis oil includes forming the low-solids biomass-derived pyrolysis oil having a solids content of about 1500 ppm or less.

3. The method according to claim 1, wherein the step of filtering the low-solids biomass-derived pyrolysis oil includes filtering the low-solids biomass-derived pyrolysis oil with the fine filter arrangement having the pore diameter of from about 5 to about 50 μm.

4. The method according to claim 1, wherein the step of filtering the low-solids biomass-derived pyrolysis oil includes filtering the low-solids biomass-derived pyrolysis oil with the fine filter arrangement having a pore diameter of from about 5 to about 50 μm, and wherein the step of filtering the biomass-derived pyrolysis oil includes filtering the biomass-derived pyrolysis oil with the high flux rate filter arrangement having the flux rate of from about 200 to about 500 L/m²/hr.

5. The method according to claim 1, wherein the step of filtering the low-solids biomass-derived pyrolysis oil includes forming the ultralow-solids biomass-derived pyrolysis oil having a solids content of about 100 ppm or less.

6. The method according to claim 1, further comprising the step of heating the biomass-derived pyrolysis oil to a temperature of from about 30 to about 60° C. prior to the step of filtering the biomass-derived pyrolysis oil.

7. The method according to claim 1, wherein the step of filtering the biomass-derived pyrolysis oil includes producing a pressure drop across the high flux rate filter arrangement of no more than about 175 kPa, and wherein the step of filtering the low-solids biomass-derived pyrolysis oil includes producing a pressure drop across the fine filter arrangement of no more than about 175 kPa.

8. The method according to claim 1, wherein the step of contacting includes forming the low-metal biomass-derived pyrolysis oil having a total metals content of about 100 ppm or less.

9. A method for forming a low-metal biomass-derived pyrolysis oil, the method comprising the steps of:
   filtering a biomass-derived pyrolysis oil to form an ultralow-solids biomass-derived pyrolysis oil, wherein during filtering the biomass-derived pyrolysis oil is a liquid that comprises metals and char, and wherein filtering comprises filtering the biomass-derived pyrolysis oil with a high flux rate filter arrangement having a filter pore diameter of about 50 μm or greater with a flux rate of about 200 L/m²/hr to about 500 L/m²/hr to form a low-solids biomass-derived pyrolysis oil, and filtering the low-solids biomass-derived pyrolysis oil with a fine filter arrangement having a pore diameter of about 50 μm or less to form the ultralow-solids biomass-derived pyrolysis oil;
   contacting a first portion of the ultralow-solids biomass-derived pyrolysis oil with an acidic ion-exchange resin having sulfonic acid groups to form a first amount of the low-metal biomass-derived pyrolysis oil and a spent ion-exchange resin;
   regenerating the spent ion-exchange resin including contacting the spent ion-exchange resin with a solution containing sodium ions to exchange potassium ions, calcium ions, magnesium ions, strontium ions, titanium ion, vanadium ions copper ions, iron ions, cobalt ions, chromium ions, lead ions, manganese ions, nickel ions, zinc ions and other mono-, divalent or trivalent metal ions present in the biomass-derived pyrolysis oil which are removed by ion exchange, or combinations thereof from the spent ion-exchange resin with the sodium ions from the solution to form a spent sodium-ion-containing exchange resin that is regenerated to form a regenerated ion-exchange resin; and contacting a second portion of the ultralow-solids biomass-derived pyrolysis oil with the regenerated ion-exchange resin to form a second amount of the low-metal biomass-derived pyrolysis oil.

10. The method according to claim 9, wherein the step of regenerating includes removing residual oil from the spent ion-exchange resin by washing the spent ion-exchange resin with an oxygenated ion-exchange regenerant.

11. The method according to claim 10, wherein the step of regenerating includes washing the spent ion-exchange resin with the oxygenated ion-exchange regenerant selected from the group consisting of ethanol, methanol, acetone, 2-butanone, and combinations thereof.

12. The method according to claim 10, wherein the step of regenerating includes rinsing the spent ion-exchange resin with water after the step of removing the residual oil.

13. The method according to claim 10, wherein the step of regenerating includes contacting the spent ion-exchange resin with the solution comprising aqueous sodium chloride.

14. The method according to claim 10, wherein the step of regenerating includes recharging the spent sodium-ion-containing exchange resin with an acidic ion-exchange regenerant to form the regenerated ion-exchange resin.

15. The method according to claim 14, wherein the step of regenerating includes contacting the spent sodium-ion-containing exchange resin with the acidic ion-exchange regenerant comprising aqueous sulfuric acid.

16. The method according to claim 14, wherein the step of regenerating includes rinsing the regenerated ion-exchange resin with water prior to the step of contacting the second portion of the ultralow-solids biomass-derived pyrolysis oil.

17. An apparatus for forming a low-metal biomass-derived pyrolysis oil, the apparatus comprising:

a high flux rate filter arrangement configured to receive and filter a biomass-derived pyrolysis oil that is a liquid comprises metals and char to form a low-solids biomass-derived pyrolysis oil, wherein the high flux filter arrangement has a filter pore diameter of about 50 μm or greater with a flux rate of about 200 $L/m^2/hr$ to about 500 $L/m^2/hr$;

a fine filter arrangement in fluid communication with the high flux rate filter arrangement to receive the low-solids biomass-derived pyrolysis oil and configured to filter the low-solids biomass-derived pyrolysis oil to form an ultralow-solids biomass-derived pyrolysis oil, wherein the fine filter arrangement has a pore diameter of about 50 μm or less; and an ion-exchange unit containing an ion-exchange resin and in fluid communication with the fine filter arrangement to receive the ultralow-solids biomass-derived pyrolysis oil, the ion-exchange unit configured to contact the ultralow-solids biomass-derived pyrolysis oil with the ion-exchange resin to remove metal ions and form the low-metal biomass-derived pyrolysis oil.

\* \* \* \* \*